United States Patent
Pohm

[15] 3,651,393
[45] Mar. 21, 1972

[54] CURRENT EQUALIZING CIRCUIT
[72] Inventor: George H. Pohm, Lorain, Ohio
[73] Assignee: Lorain Products Corporation
[22] Filed: Apr. 21, 1971
[21] Appl. No.: 135,982

[52] U.S. Cl..................321/5, 317/47, 320/60, 321/13, 321/19, 321/25, 321/27, 323/20
[51] Int. Cl..................H02m 7/00, H02h 3/00, G05f
[58] Field of Search..................321/5, 13, 19, 24, 25, 27; 323/20, 24, 34; 317/47; 320/32, 39, 60, DIG. 2

[56] References Cited

UNITED STATES PATENTS

| | | | |
|---|---|---|---|
| 3,229,187 | 1/1966 | Jensen | 321/27 R |
| 3,317,813 | 5/1967 | Schaefer | 323/34 |
| 3,373,337 | 3/1968 | Hung | 323/24 X |
| 3,401,308 | 9/1968 | Darke | 317/47 |
| 3,409,821 | 11/1968 | Bingley | 323/24 X |
| 3,566,245 | 2/1971 | Blokker et al. | 321/5 |
| 3,571,689 | 3/1971 | Wise | 321/5 |

Primary Examiner—William H. Beha, Jr.
Attorney—John Howard Smith

[57] ABSTRACT

A circuit for equalizing the AC input currents drawn by a polyphase rectifier. A plurality of sensing networks are connected in current sensing relationship to respective phases of a polyphase source, each sensing network providing an output voltage which is proportional to the current sensed thereby. The outputs of these sensing networks are connected in parallel to establish a plurality of circulating currents, the magnitude and direction of each circulating current being dependent upon the output voltage of all sensing networks. The latter currents are utilized to simultaneously change each of the sensed currents, as required, to achieve input current equality.

7 Claims, 2 Drawing Figures

PATENTED MAR 21 1972  3,651,393

INVENTOR.
GEORGE H. POHM
BY John Howard Smith
ATTORNEY 3,651,393

CURRENT EQUALIZING CIRCUIT

BACKGROUND OF THE INVENTION

The present invention relates to control circuitry and is directed more particularly to circuitry for equalizing the AC currents drawn by a polyphase rectifier.

In charging batteries which have high ampere-hour ratings, it has been the practice to utilize battery chargers that are energized with polyphase AC input voltages. One reason is that a DC voltage produced by rectifying polyphase voltages requires less filtering than a DC voltage produced by rectifying a single phase voltage. In such battery chargers, control of the magnitude of the output voltage is achieved by advancing or retarding the times at which various controlled rectifiers such as thyristors are rendered conducting. This is often accomplished by connecting a feedback control circuit including a plurality of magnetic amplifiers in switching control relationship to the controlled rectifiers.

Prior to the present invention, the problem has been that, due to differences in the operating characteristics of the magnetic amplifiers, there occurred substantial differences in the average currents flowing through different controlled rectifiers. To assure that these differences did not result in overheating, the current rating of each controlled rectifier had to be chosen so that the worst-case value of excess current could flow therethrough without damage. This sometimes resulted in the utilization of controlled rectifiers having an uneconomically large power rating.

In addition, the flow of unequal currents in the controlled rectifiers caused the currents drawn from the polyphase line conductors to be unequal. Under the circumstances where high currents were drawn from the charger output, these unequal currents caused sufficient voltage drop in the polyphase line conductors to unbalance the AC voltages appearing therebetween. This interfered with the operation of other polyphase loads.

SUMMARY OF THE INVENTION

Accordingly, it is an object of the invention to provide improved switching control circuitry.

Another object of the invention is to provide circuitry for balancing the currents which a polyphase circuit draws from a polyphase source.

Still another object of the invention is to provide circuitry for advancing or retarding the firing of the controlled rectifiers of one phase of a polyphase circuit in accordance with the current in all phases of that circuit.

Yet another object of the invention is to provide circuitry responsive to the current flowing in a plurality of polyphase line conductors for controlling a plurality of magnetic amplifiers which, in turn, control the currents flowing in all of those line conductors.

A further object of the invention is to provide circuitry wherein a plurality of magnetic amplifiers are controlled in accordance with the circulating currents that flow between a plurality of sensing networks, each of which establishes an output voltage dependent upon the current in a respective phase of a polyphase rectifier.

More specifically, it is an object of the invention to provide circuitry including a plurality of sensing networks for establishing voltages which are proportional to the currents in respective phases of a polyphase rectifier and circuitry for connecting the latter networks in mutually adjusting relationship through the control circuits of a plurality of magnetic amplifiers.

It is another object of the invention to provide circuitry for making the currents in different phases of a polyphase circuit approach a common value and for holding those currents at that common value after the latter has been attained.

DESCRIPTION OF THE INVENTION

Figure 1:
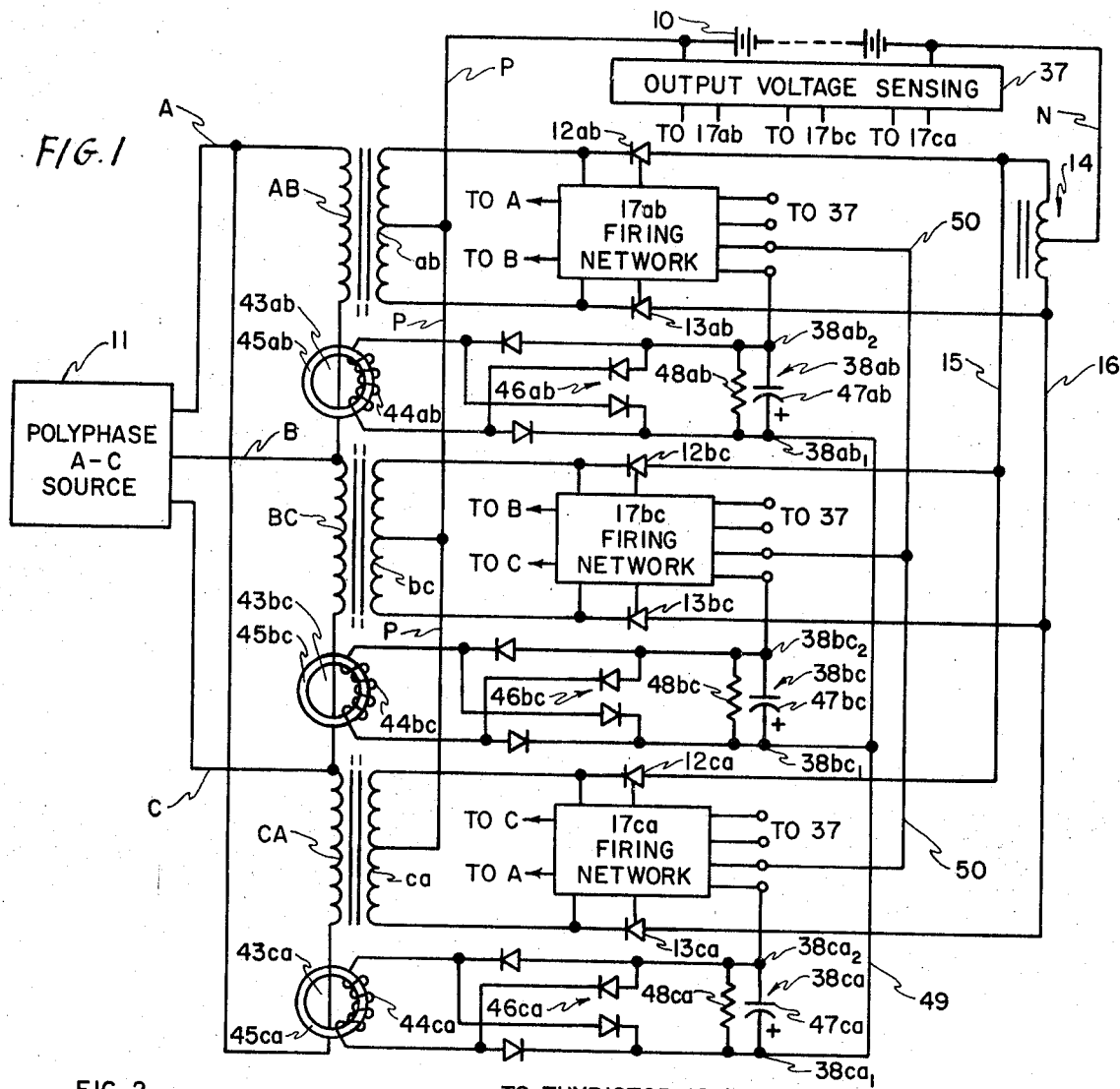
FIG. 1 is a combined schematic and block diagram showing one embodiment of the circuit of the invention and FIG. 2 is a schematic diagram showing the circuitry appearing in block form in FIG. 1.

Referring to FIG. 1, there is shown, for the purpose of explanation, an AC to DC converter for charging a battery 10 from a three-phase AC source 11. In the present embodiment the converter circuit includes a polyphase transformer having three primary-secondary winding pairs AB and $ab$, BC and $bc$ and CA and $ca$. These winding pairs may be located on respective legs of a single, three-legged core, as indicated by the dotted lines in FIG. 1, or may be located on separate cores. The converter circuit also includes a plurality of pairs of alternately conducting switching means 12$ab$ and 13$ab$, 12$bc$ and 13$bc$ and 12$ca$ and 13$ca$ which here take the form of thyristors.

Primary windings AB, BC and CA may be connected in a delta configuration between polyphase line conductors A, B and C. Secondary windings $ab$, $bc$ and $ca$ are center-tapped and connected to battery 10 through a positive bus P and a negative bus N. Secondary winding $ab$, for example, is connected to positive bus P at its center tap and to negative bus N at its end through thyristors 12$ab$ and 13$ab$ and an inter-phase transformer 14. The latter serves to lower the peak current flowing through each thyristor while increasing the conduction period thereof.

When the voltage across primary winding AB has a first polarity, conduction is initiated in thyristor 12$ab$ to establish a downward flowing charging current through battery 10. Similarly, after the voltage across primary winding AB reverses, conduction is initiated in thyristor 13$ab$ to again establish a downward flowing charging current through battery 10. Since battery 10 charges during both half-cycles of the AC voltage across primary winding AB, it will be seen that secondary winding $ab$ and thyristors 12$ab$ and 13$ab$ are connected as a full wave rectifying network between primary winding AB and battery 10.

The average value of the above described charging current depends upon the time during each half-cycle when thyristor conduction is initiated. If, for example, conduction begins late in the half-cycle, the average value of the charging current through battery 10 (and, therefore, the magnitude of the AC input current drawn from source 11 by primary AB) will be relatively small. If, on the other hand, conduction begins early in the half-cycle, the average value of the charging current through battery 10 (and, therefore, the magnitude of the AC input current drawn from source 11 by primary AB) will be relatively larger.

It will be understood that the above remarks are equally applicable to the rectifying networks including secondary windings $bc$ and $ca$ and thyristor pairs 12$bc$ and 13$bc$ and 12$ca$ and 13$ca$, respectively. The latter networks are connected to battery 10, in power-aiding relationship to the first described rectifying network, through conductors 15 and 16.

Figure 2:
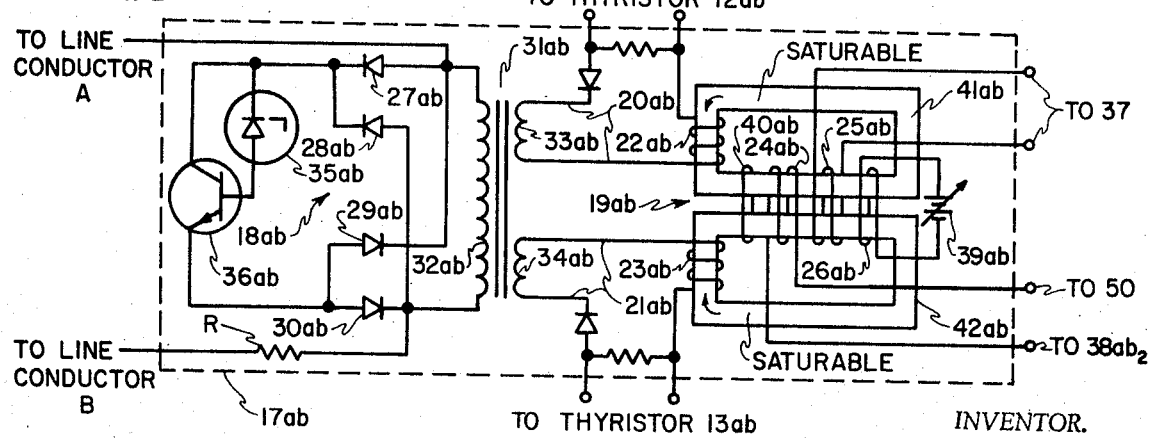

To the end that the conduction of the above described rectifying networks may be controlled to afford the desired load voltage regulation and input current equalization, there are provided firing networks 17$ab$, 17$bc$ and 17$ca$. As shown in FIG. 2, firing network 17$ab$ includes firing pulse generating means which here takes the form of a line voltage clipping network 18$ab$ and controllable conducting means which here takes the form of a magnetic amplifier 19$ab$.

As will be described more fully presently, clipping network 18$ab$ utilizes the voltage between line conductors A and B to generate substantially square wave voltages on conductor pairs 20$ab$ and 21$ab$. These voltages are applied to the gate-cathode circuits of thyristors 12$ab$ and 13$ab$, respectively, through the gate windings 22$ab$ and 23$ab$, respectively, of magnetic amplifier 19$ab$. These gate windings allow the times at which gate-cathode control currents begin to flow in thyristors 12$ab$ and 13$ab$ to be controlled in accordance with the currents flowing in the control windings 24$ab$, 25$ab$ and 26*ab* and, thereby, in accordance with the DC output voltage and AC input current. It will be understood that firing networks 17*bc* and 17*ca* include similar networks and function in a similar manner.

To the end that pulse generating network 18*ab* may provide the desired thyristor firing pulses, the latter network includes a full wave bridge rectifier comprising diodes 27*ab*, 28*ab*, 29*ab* and 30*ab*, a coupling transformer 31*ab* having a primary winding 32*ab* and first and second secondary windings 33*ab* and 34*ab*, and a breakdown or zener diode 35*ab*. When line conductor A is positive from line conductor B by a voltage sufficient to breakdown diode 35*ab*, current flows from conductor A to conductor B through diode 27*ab*, zener diode 35*ab*, the base-emitter circuit of a transistor 36*ab*, diode 30*ab* and a current limiting resistor R. Under these conditions, the voltage across primary winding 32*ab* has a first polarity and is equal to the sum of the voltage drops across the above named circuit elements, each of which is substantially constant and independent of the magnitude of current flow. Transistor 36*ab* serves to keep the current through zener diode 35*ab* at a low level by shunting current therearound.

Similarly, when the polarity of the voltage between line conductors A and B reverses, current flows through zener diode 35*ab* and transistor 36*ab* through diodes 28*ab* and 29*ab*. Under the latter conditions, the voltage across primary winding 32*ab* has a second, reversed polarity and a magnitude which is substantially constant and equal to that described above. Thus, a substantially squarewave of voltage appears across primary winding 32*ab* and secondary windings 33*ab* and 34*ab*.

In order that the above squarewave voltages may be utilized to control the conduction of thyristors 12*ab* and 13*ab* in accordance with the magnitude of the DC output voltage and the imbalance between the polyphase input current, control winding 25*ab* of magnetic amplifier 19*ab* is connected to a suitable output voltage sensing network 37 and control winding 24*ab* thereof is connected to current sensing means 38*ab*. Additional control windings include a bias winding 26*ab* which is connected to a suitable bias source 39*ab* and a short circuited control winding 40*ab* which assists in resetting the flux in magnetic amplifier cores 41*ab* and 42*ab*.

In the present embodiment, input current sensing network 38*ab* includes a current transformer 43*ab* having a one turn primary through which flows the current in primary winding AB and a secondary winding 44*ab* wound on a toroidal core 45*ab*. Sensing network 38*ab* also includes a full wave rectifying bridge 46*ab* and a filtering network include a capacitor 47*ab* and a bleeder resistor 48*ab*. This network serves to provide a DC voltage at output terminals 38*ab*$_1$ and 38*ab*$_2$ which is a function of the AC current flowing in primary winding AB. It will be understood that sensing networks 38*bc* and 38*ca* operate in a similar manner to provide DC output voltages which are functions of the AC currents in primary windings BC and CA.

In order that sensing networks 38*ab*, 38*bc* and 38*ca* may control firing networks 17*ab*, 17*bc* and 17*ca* to assure the desired substantially equal AC input current distribution, positive sensing network output terminals 38*ab*$_1$, 38*bc*$_1$ and 38*ca*$_1$ are connected together by a conductor 49 and the negative sensing network output terminals 38*ab*$_2$, 38*bc*$_2$ and 38*ca*$_2$ are connected together by a conductor 50 through control windings 24*ab*, 24*bc* and 24*ca*. This assures that the current in each of the above control windings is influenced by the AC input currents measured by the other sensing networks.

Since the outputs of sensing networks 38*ab*, 38*bc* and 38*ca* are connected in parallel by conductors 49 and 50 and control windings 24*ab*, 24*bc* and 24*ca*, the voltage between the latter conductors is a function of the voltages produced by all sensing networks. The magnitude of this voltage is dependent upon the output voltage of each sensing network and upon the magnitudes and directions of the currents in control windings 24*ab*, 24*bc* and 24*ca*, these currents being, in turn, dependent upon differences in the output voltages of sensing networks 38*ab*, 38*bc* and 38*ca*.

Assuming, for example, that the current in primary winding CA is greater than the current in either primary winding AB or primary winding BC, the output voltage of sensing network 38*ca* will be greater than the output voltages of sensing networks 38*ab* and 38*bc*. Because these outputs are connected in parallel by conductors 49 and 50 through control windings 24*ab*, 24*bc* and 24*ca*, it is apparent that circulating currents will flow among the latter. These circulating currents will distribute themselves so that the voltage across each series branch including a control winding and a sensing network output will be equal to the voltage across each other series branch. The resulting voltage appears between conductors 49 and 50.

In the present example, current will flow out of sensing network output 38*ca*$_1$ to produce a voltage drops across control winding 24*ca* which is equal to the difference between the output voltage of network 38*ca* and the voltage between conductors 49 and 50. At the same time, current will flow into sensing network outputs 38*ab*$_1$ and 38*bc*$_1$ to produce voltage drops across control windings 24*ab* and 24*bc* which are equal to the differences between the output voltages of networks 38*ab* and 38*bc* and the voltage between conductors 49 and 50. Thus, the magnitudes and directions of current flow through control windings 24*ab*, 24*bc* and 24*ca* are dependent upon differences between the output voltages of sensing networks 38*ab*, 38*bc* and 38*ca* and, therefore, dependent upon differences between the currents in primary windings AB, BC and CA.

To accomplish the objective of the invention, the above described circulating currents are utilized to eliminate any inequality in the AC input currents flowing in AC line conductors A, B and C. To the end that this may be accomplished, each control winding is arranged to delay the conduction of the respective gate winding if current flows out of the positive sensing network output in series therewith, and to advance the conduction of that switching if current flows into the positive sensing network output in series therewith. This assures that those sensing networks which have a high output voltage, due to their association with primary windings having excessive currents, produce outward flowing current and thereby reduce the currents in the respective primary windings and that those sensing networks which have lower output voltages, due to their association with primary windings having insufficient currents, produce inward flowing currents and thereby increase the currents in the respective primary windings. Thus, the magnitudes of the primary currents are made to approach a value at which they will be equal to one another. It will be understood that once a substantially equal input current distribution is achieved, the above described circulating currents will maintain the condition of equality.

As shown in FIG. 2, control winding 24*ab* is wound so that the flow of a current in a counter-clockwise direction therethrough (the direction of flow of current flowing out of positive sensing network output 38*ab*$_1$) opposes the flux produced by gate windings 22*ab* and 23*ab*, and so that the flow of a current in a clockwise direction through control winding 24*ab* (the direction of flow of current flowing into positive sensing network output 38*ab*$_1$) aids the flux produced by gate windings 22*ab* and 23*ab*. Consequently, it will be seen that the flow of current into sensing network input 38*ab*$_1$ delays the firing of thyristor 12*ab* and 13*ab* and thereby reduces the magnitude of the AC current in primary winding AB and that the flow of current out of sensing network input 38*ab*$_1$ hastens the firing of thyristors 12*ab* and 13*ab* and thereby increases the magnitude of the AC current in primary winding AB. Thus, extreme values of primary current are eliminated by the flow of circulating currents between parallel connected control windings.

Because the above described circulating currents flow in response to differences in the output voltages of the sensing networks and, therefore, in response to differences in the currents in primary winding AB, BC and CA, it will be seen that the circuit of the invention operates to establish primary current equality. As this equality is approached, the capacitor voltages will approach equality and thereby, reduce the flow of the above circulating currents. Thus, control windings 24ab, 24bc and 24ca will not interfere with other controls over firing networks 17ab, 17bc and 17ca once input current equality is achieved.

From the foregoing, it will be seen that a switching control circuit constructed in accordance with the invention is adapted to sense the magnitudes of a plurality of currents and to utilize the differences therebetween to equalize the magnitudes thereof, this being accomplished by utilizing a novel circuit arrangement responsive to differences in that plurality of currents to control each such current.

It will be understood that the above embodiment is for explanatory purposes only and may be changed or modified without departing from the spirit and scope of the appended claims.

What is claimed is:

1. In a current control circuit for equalizing the currents which flow in different phases of a polyphase network, in combination, polyphase AC terminal means, DC terminal means, switching means for controlling the flow of current between said AC and DC terminal means, means for connecting said switching means in current control relationship between said AC and DC terminal means, a plurality of current sensing networks each including first and second output terminals, said sensing networks serving to establish output voltages which are substantially proportional to the currents sensed thereby, means for connecting said sensing networks in current sensing relationship to respective phases of said polyphase network, a plurality of firing networks each including at least first and second input terminals, means for connecting said firing networks in conduction control relationship to predetermined switching means, means for connecting together said first output terminals of said sensing networks, means for connecting together said first input terminals of said firing networks and means for connecting the second output terminal of each sensing network to the second input terminal of a respective firing network.

2. In a current control circuit for equalizing the currents which flow in different phases of a polyphase network, in combination, polyphase AC terminal means, DC terminal means, switching means for controlling the flow of current between said AC and DC terminal means, means for connecting said switching means in current conducting relationship between said AC and DC terminal means, a plurality of current sensing networks each including output means, means for connecting said sensing network in current sensing relationship to respective phases of said polyphase source, each sensing network serving to establish an output voltage which varies in accordance with the current sensed thereby, a plurality of firing networks each including input means whereby the firing activity thereof may be advanced or retarded and output means, means for connecting the output means of said firing networks in conduction control relationship to respective switching means, means for connecting the output means of each of said sensing networks in series with the input means of the respective one of said firing networks to establish a plurality of series branches and means for connecting said series branches in parallel, circulating current establishing relationship to one another to achieve interdependent control of said firing networks.

3. A current equalizing circuit as set forth in claim 2 wherein said current sensing networks each include a current transformer, an AC and DC converter network and means for connecting the former to the latter.

4. A current equalizing circuit as set forth in claim 2 wherein each of said firing networks includes a magnetic amplifier including gate winding means and control winding means, means for connecting said gate winding means to the output means of said firing network, means for connecting at least one of said control winding means to the input means of said firing network.

5. In a current control circuit for equalizing the currents which flow in different phases of a polyphase network, in combination, polyphase AC terminal means, a polyphase transformer having a plurality of primary and secondary windings, means for connecting said polyphase AC terminal means to said primary windings, a load, switching means for controlling the flow of current between said load and said secondary windings, means for connecting said switching means between said secondary windings and said load, a plurality of current sensing networks each having AC input means and DC output means, means for connecting the input means of said sensing networks in current sensing relationship to respective primary windings, a plurality of firing networks each having input means and output means, means for connecting the output means of said firing networks in conduction control relationship to respective switching means and means for connecting the outputs of said sensing networks to the input means of said firing networks to afford simultaneous, interdependent control thereof.

6. In a current control circuit for equalizing the currents which flow in different phases of a polyphase network, in combination, polyphase AC terminal means, DC terminal means, a polyphase switching circuit for controlling the flow of current between said AC terminal means and said terminal means, said switching circuit including a plurality of switching means for controlling the magnitude of current in respective phases of said polyphase network, a plurality of sensing networks each having output means, means for connecting said sensing networks in current sensing relationship to each phase of said polyphase network, a plurality of means for firing said switching means, said firing means being adapted to hasten or delay the firing of said switching means in accordance with the magnitude and direction of current at the inputs thereof, and means for controlling the magnitudes and directions of currents at the inputs of said firing means in accordance with differences in the voltages at the outputs of said sensing networks.

7. In a current control circuit for equalizing the currents which flow in different phases of a polyphase network, in combination, polyphase AC terminal means, a transformer having a plurality of primary windings and a plurality of secondary windings, means for connecting said AC terminal means to said primary windings, a plurality of controlled rectifying networks, each of said rectifying networks including a plurality of switching control inputs, a DC load, means for connecting said rectifying networks between said secondary windings and said DC load, firing pulse generating means, means for connecting said source in energizing relationship to said pulse generating means, variable conducting means having input means and output means, means for connecting the output means of said variable conducting means between respective pulse generating means and the switching control inputs of respective rectifying networks, current sensing means, means for passing said primary currents through said current sensing means, means for connecting said sensing means to the inputs of respective variable conducting means and means for connecting together the inputs of said variable conducting means, each sensing means serving to increase the conductivity of the respective rectifying network when current flows therethrough in one direction and to decrease the conductivity of the respective rectifying network when current flows therethrough in the other direction.

* * * * *

UNITED STATES PATENT OFFICE
CERTIFICATE OF CORRECTION

Patent No. 3,651,393       Dated March 21, 1972

Inventor(s) George H. Pohm

It is certified that error appears in the above-identified patent and that said Letters Patent are hereby corrected as shown below:

Claim 3, line 3, change "and", first occurrence, to --to--.

Claim 6, line 5, after "said", second occurrence, insert --DC--.

Signed and sealed this 15th day of August 1972.

(SEAL)
Attest:

EDWARD M. FLETCHER, JR.
Attesting Officer

ROBERT GOTTSCHALK
Commissioner of Patents